G. PFEIFFER, Jr.
WATER PURIFYING APPARATUS.
APPLICATION FILED MAR. 5, 1909.
927,278.
Patented July 6, 1909.
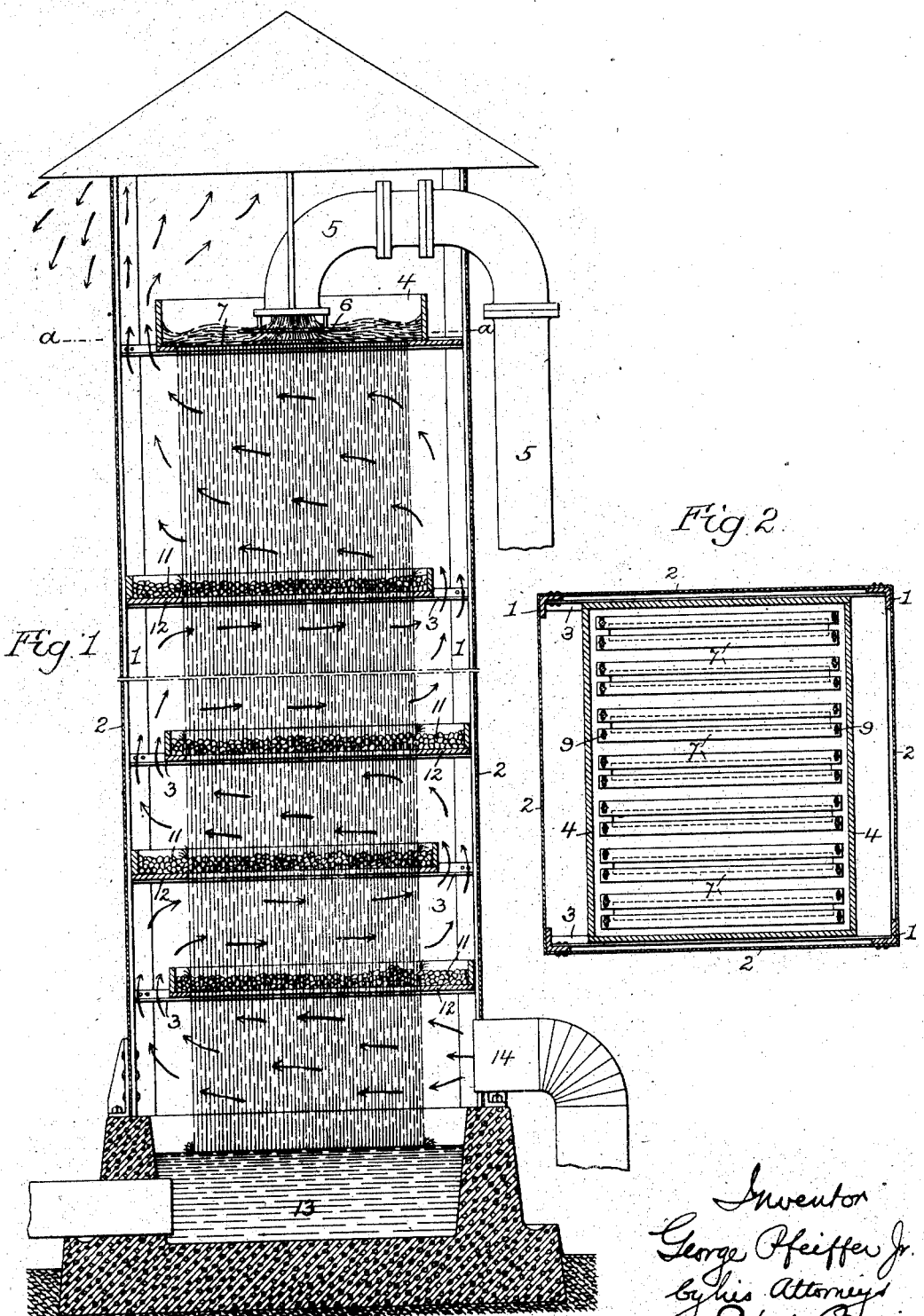

UNITED STATES PATENT OFFICE.

GEORGE PFEIFFER, JR., OF MERCHANTVILLE, NEW JERSEY.

WATER-PURIFYING APPARATUS.

No. 927,278.   Specification of Letters Patent.   Patented July 6, 1909.

Application filed March 5, 1909.  Serial No. 481,222.

*To all whom it may concern:*

Be it known that I, GEORGE PFEIFFER, Jr., a citizen of the United States, residing in Merchantville, New Jersey, have invented certain Improvements in Water-Purifying Apparatus, of which the following is a specification.

The object of my invention is to so construct a water purifier as to combine therein simplicity and cheapness of construction, large capacity and efficiency of action. This object I attain in the manner hereinafter set forth, reference being had to the accompanying drawing, in which—

Figure 1 is a vertical sectional view of a water purifier constructed in accordance with my invention, and Fig. 2 is a horizontal section on the line $a$—$a$, Fig. 1.

The purifier is in the form of a tower which may be constructed in any desired way and may be of any desired horizontal cross section. As shown in the present instance, it is of rectangular cross section and consists of angle iron posts 1 located at the corners of the tower and having secured to them an external sheathing 2 which may be of light sheet metal as it is not subjected to pressure or strain.

Connecting the corner posts are horizontal bars 3, the uppermost of these bars serving for the support of a distributer 4 which receives the water from the downwardly bent upper end of the supply stand pipe 5, a spreader plate 6 being supported immediately below the downwardly discharging mouth of the stand pipe in order to receive the impact of the incoming volume of water and spread the latter over the bottom of the separator, the latter consisting of a box with slotted bottom, the area of the slots being regulable by the adjustment from and toward each other of plates 7 which are slidably mounted upon the bottom of the box and which can be secured in position after any desired adjustment by any suitable means, as, for instance, by means of bolts 9 adapted to slots in the outer portions of the slides, as shown in Fig. 2.

The volume of flow being regulated to accord with the area of the opening provided by the slides 7, said flow is divided into relatively thin and laterally separated streams which, in their descent, are caused to pass through successive bodies 11 of coke or other suitable filtering material deposited in boxes 12 which are supported upon the bars 3 of the tower in the same manner as the distributing box 4. These boxes 12 have, in their bottoms, openings for the passage of the water and by preference these openings are provided with adjustable slides for regulating their area.

The filtering boxes 12 are disposed at suitable distances apart throughout the height of the tower in order that the falling water may be caused to pass through the filtering bodies in succession, the water dropping from the lowermost filtering box being collected in a well or tank 13 at the base of the tower from which it can be withdrawn for use or for being subjected to the action of a supplementary filtering bed over which the water is permitted to flow and which serves to separate from the water any impurities held in mechanical suspension therein and which may not have been removed therefrom by the filtering material in the boxes 12 contained in the tower.

Each of the boxes 12 is shorter than the width of the tower and the boxes are so disposed as to contact with one side of the tower and leave a space between the box and the opposite side of the tower, these spaces being first at the right hand side of the tower and then at the left hand side of the same so as to provide a zigzag or tortuous course for air supplied to the lower portion of the tower by means of a pipe 14, the current of air therefore passing laterally across the falling streams of water as the latter flow from the distributing box 4 at the top of the tower to the uppermost filtering box or from filter box to filter box throughout the height of the tower, as indicated by dotted lines in Fig. 1, the bottom of each filter box, at that end which is in contact with the side of the tower, projecting to such an extent as to overlap the space between the side of the tower and the end of the filter box below, whereby these spaces are kept free from any falling body of water and the forward flow of the air through the tower is not interfered with by such falling bodies, the flow of the air, when in contact with the water, being at right angles to the direction of the water flow whereby the latter offers a minimum of resistance to the passage of the air, while, at the same time a maximum of surface is exposed for the action of the air upon the finely divided bodies of water, such action serving to oxidize the oxidizable impurities contained in the water and cause them to be deposited upon the filtering material in the filter boxes 12, the current of air also carrying off any free gas which may be in the water or any gas which may be freed therefrom by the action of the air thereupon, the mixture of air and gases escaping at the top of the tower as shown by the arrows in Fig. 1.

I claim:

1. A water purifier consisting of a tower, means for supplying water at the top of the same, means for supplying air at the bottom of the tower, and a succession of filter beds disposed one above another in the tower with spaces between them.

2. A water purifier consisting of a tower, means for supplying water at the top of the same and air at the bottom, and a succession of filter beds disposed one above another in the tower, with spaces between them, whereby the water is caused to pass through said filter beds in succession, the filter beds being so disposed that the air in its passage through the tower is caused to take a tortuous course.

3. A water purifier consisting of a tower, means for supplying water at the top of the same and air at the bottom, a succession of filter beds disposed one above another in said tower, with spaces between them, and a distributer at the top of the tower having means for regulating the area of the discharge therefrom.

4. The combination, in a water purifier, of a tower, means for supplying water at the top of the same and air at the bottom, a series of filter beds disposed one above another with spaces between them, and a distributer at the top of the tower having a slotted bottom with adjustable slides whereby the area of said slots can be increased or diminished.

In testimony whereof, I have signed my name to this specification, in the presence of two subscribing witnesses.

GEORGE PFEIFFER, Jr.

Witnesses:
HAMILTON D. TURNER,
KATE A. BEADLE.